United States Patent [19]

Enlow et al.

[11] Patent Number: 5,805,450
[45] Date of Patent: Sep. 8, 1998

[54] ELECTRONIC IGNITION TIMING CONTROL AND ENGINE MANAGEMENT SYSTEM

[75] Inventors: David L. Enlow, Wadsworth; James N. Furukawa, Vernon Hills, both of Ill.; Dale A. Wiegele, Kenosha, Wis.

[73] Assignee: Outboard Marine Corporation, Waukegan, Ill.

[21] Appl. No.: 389,091

[22] Filed: Feb. 15, 1995

[51] Int. Cl.⁶ ............................................... B60K 41/00
[52] U.S. Cl. ............................ 364/431.053; 364/431.1
[58] Field of Search ..................... 364/431.04, 431.08, 364/431.05, 431.053, 431.052, 431.051, 431.03, 431.1; 123/117 D, 416, 602, 603, 613, 630

[56] References Cited

U.S. PATENT DOCUMENTS

| | | | |
|---|---|---|---|
| 4,009,699 | 3/1977 | Hetzler et al. ........................ | 123/117 D |
| 4,112,887 | 9/1978 | Chateau ................................ | 123/117 D |
| 4,127,092 | 11/1978 | Fresow et al. ........................ | 123/117 D |
| 4,375,668 | 3/1983 | Leung et al. ......................... | 364/431.08 |
| 4,376,428 | 3/1983 | Hata et al. ............................ | 123/417 |
| 4,378,770 | 4/1983 | Ikeura ................................... | 123/424 |
| 4,426,973 | 1/1984 | Nakano et al. ....................... | 123/418 |
| 4,441,478 | 4/1984 | Fujimoto ............................... | 123/602 |
| 4,445,477 | 5/1984 | Ikeura ................................... | 123/416 |
| 4,445,478 | 5/1984 | Momoyama .......................... | 123/418 |
| 4,459,951 | 7/1984 | Tobinaga et al. .................... | 123/198 DC |
| 4,480,602 | 11/1984 | Kobayashi et al. ................. | 123/73 AD |
| 4,492,197 | 1/1985 | Yamamoto et al. ................. | 123/630 |
| 4,527,522 | 7/1985 | Cerny ................................... | 123/416 |
| 4,528,970 | 7/1985 | Fujimoto .............................. | 123/602 |
| 4,558,683 | 12/1985 | Okuda .................................. | 123/599 |
| 4,582,032 | 4/1986 | Hara et al. ........................... | 123/339 |
| 4,594,978 | 6/1986 | Kanno .................................. | 123/335 |
| 4,612,899 | 9/1986 | Honjoh et al. ...................... | 123/413 |
| 4,633,834 | 1/1987 | Takeuchi et al. ................... | 123/424 |
| 4,640,249 | 2/1987 | Kawamura et al. ................ | 123/425 |
| 4,644,927 | 2/1987 | Okuda .................................. | 123/602 |
| 4,649,888 | 3/1987 | Kawai et al. ........................ | 123/609 |
| 4,718,394 | 1/1988 | Honjon et al. ...................... | 123/599 |
| 4,790,279 | 12/1988 | Tobinaga et al. ................... | 123/417 |
| 4,809,660 | 3/1989 | Marsh et al. ........................ | 123/417 |
| 4,843,556 | 6/1989 | Wakeman et al. ................. | 364/431.08 |
| 4,844,034 | 7/1989 | Honjo et al. ........................ | 123/424 |
| 4,856,488 | 8/1989 | Okuda .................................. | 123/599 |
| 4,887,581 | 12/1989 | Okuda .................................. | 123/602 |
| 4,893,600 | 1/1990 | Holmes ................................ | 123/419 |
| 4,967,719 | 11/1990 | Okuda .................................. | 123/643 |
| 4,976,234 | 12/1990 | Okuda ................................. | 123/198 DC |
| 4,976,240 | 12/1990 | Okuda .................................. | 123/406 |
| 4,982,717 | 1/1991 | Okuda .................................. | 123/603 |
| 4,987,870 | 1/1991 | Koiwa et al. ....................... | 123/335 |
| 5,000,150 | 3/1991 | Miyama et al. .................... | 123/425 |
| 5,001,645 | 3/1991 | Williams et al. .................. | 364/431.08 |
| 5,009,209 | 4/1991 | Okuda et al. ....................... | 123/415 |
| 5,038,743 | 8/1991 | Remmers ............................ | 123/602 |
| 5,040,519 | 8/1991 | Remmers ............................ | 123/602 |
| 5,048,486 | 9/1991 | Okuda et al. ....................... | 123/418 |
| 5,070,839 | 12/1991 | Okuda .................................. | 123/416 |
| 5,074,274 | 12/1991 | Okuda .................................. | 123/604 |
| 5,076,249 | 12/1991 | Ikeuchi et al. ..................... | 123/613 |
| 5,085,191 | 2/1992 | Okuda .................................. | 123/414 |
| 5,105,785 | 4/1992 | Okuda .................................. | 123/423 |
| 5,123,390 | 6/1992 | Okuda .................................. | 123/415 |
| 5,555,858 | 9/1996 | Katoh .................................. | 123/73 SC |

*Primary Examiner*—Kevin J. Teska
*Assistant Examiner*—Stephen J. Walder, Jr.
*Attorney, Agent, or Firm*—Jones, Day, Reavis & Pogue

[57] ABSTRACT

An electronic ignition and engine management system with anti-lockup and anti-kickback features for use in an internal combustion marine engine wherein the engine's operating speed is measured and appropriate ignition advance timing values are determined from the operating speed. An ignition pulse is generated at the ignition advances unless the engine is in a startup mode, or below a predetermined startup threshold speed. During startup mode, ignition pulses are generated at or top dead center to avoid overadvanced firing conditions and thus prevent engine lockup and kickback.

38 Claims, 7 Drawing Sheets

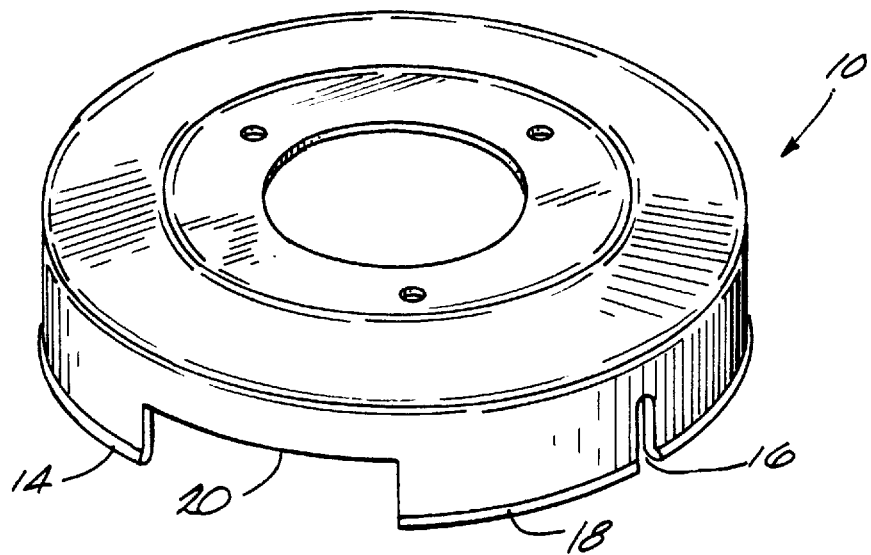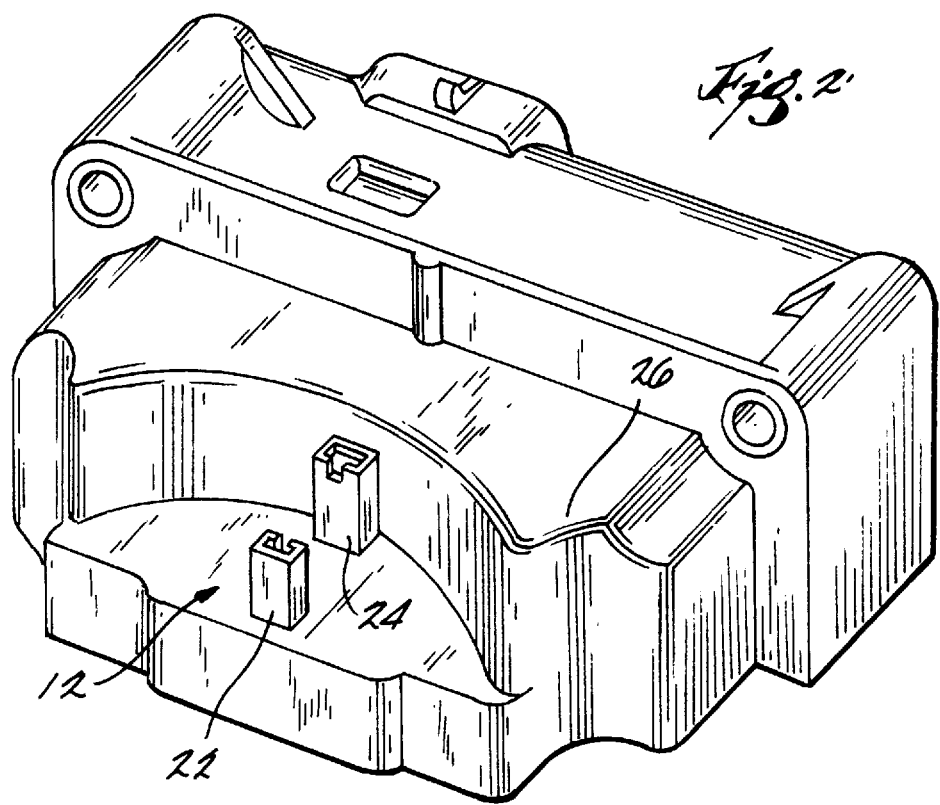

ELECTRONIC IGNITION TIMING CONTROL AND ENGINE MANAGEMENT SYSTEM

BACKGROUND OF THE INVENTION

1. Field of the Invention

The present invention relates generally to electronic ignitions and engine management systems. More particularly, the present invention relates to electronic ignitions and engine management systems for internal combustion marine engines which include anti-lockup and anti-kickback for startup conditions, an electronic timing advance, overspeed control, critical operating condition control and ignition inhibit for low RPM conditions.

2. Background Information

Ignition timing in an internal combustion engine is often used to increase the performance of the engine. Efficient performance is affected by the timing of the ignition with respect to the position of the piston in its upward travel in the cylinder in which it is housed.

Ignition timing control has been employed in marine engines for accomplishing easier engine warm-up. It has also been used to prevent reverse engine operation and to protect the engine from damage due to critical operating conditions such as low oil pressure or high operating temperature.

The adjustment of the advance of ignition of an internal combustion engine is a major function of an ignition system. An igniter, such as a spark plug, ignites gases in the cylinder to cause an explosion which drives the piston downward. Normal ignition occurs at "top dead center" which is defined as the point at which the piston reaches the maximum position of upward travel. During ignition advance, ignition takes place at a point before the piston reaches top dead center.

Most systems assume a consistent rotational speed when calculating the ignition timing. When there are major discrepancies in the instantaneous speed from the point of measurement to the point of firing, errors in ignition timing are induced. This is most evident during the initial cranking operation when starting the engine. Typically, the engine will go from 0 to 250 RPM in one engine rotation. This generally results in an overadvanced firing condition which can cause immediate stopping of forward engine movement (perceived as the engine locking up) or the sudden reverse rotation of the engine (kickback).

It is, in some cases, desirable to advance the ignition timing to increase the operating efficiency of the engine. Efficient operation is dependent upon the relationship between ignition advance and engine speed. Therefore, engine speed should dictate the amount of ignition advance employed.

Damage can result to an internal combustion engine when the engine is run under critical operating conditions such as low oil pressure or high operating temperature. It is elementary that motor oil lubricates the working parts of an internal combustion engine. When the circulation of motor oil falls below normal operating levels, the working parts may not receive sufficient lubrication. This generally results in poor engine performance and damage to the working parts of the engine. Similarly, continued operation of an internal combustion engine at excessively high operating temperatures often results in damage to the engine's components.

Overspeed conditions occur when an internal combustion engine is operating faster than recommended. Continued operation of an internal combustion engine during overspeed condition can also cause engine damage. Overspeed conditions can occur during any of the previously mentioned operating states.

At higher engine speeds it is generally more efficient to advance engine ignition. However, at lower engine speeds efficient engine performance is generally achieved by having ignition occur at or near top dead center. Therefore, ignition systems should be configured to have variable ignition advance which could advance or inhibit ignition in response to engine operating speed.

Because efficiency of operation of an engine is dependent upon the relationship of ignition advance and engine rotational speeds, ignition advance in internal combustion engines is frequently controlled dependent upon engine operating speed. Therefore, it is important to have an accurate and reliable mechanism for determining the engine's operating speed.

Engines typically function over a wide range of operating speeds and other variable conditions. These conditions and operating speeds can change very rapidly. Because the performance of the engine is directly affected by the timing of the ignition, ignition systems should react predictably and accurately to the changing engine conditions.

Accordingly, it is a general object of the present invention to provide an improved electronic timing control and engine management system in which ignition advancement is determined with respect to engine speed as well as other engine operating parameters.

It is another object of the present invention to provide an improved anti-lockup and anti-kickback feature to prevent overadvanced firing conditions during engine startup and during other situations of inconsistent rotational engine speed.

It is still another object of the present invention to provide an improved ignition system which protects the engine from excessive damage due to low oil pressure, high operating temperature or other adverse engine conditions by inhibiting ignition so that the engine will only be allowed to operate at reduced speeds.

It is a further object of the present invention to provide an improved ignition system with a variable ignition advance wherein the ignition advance is dependent upon, among other things, the engine speed so that proper ignition advance will occur when the engine is operating at normal engine speeds and the ignition will be inhibited during overspeed conditions.

It is still a further object of the present invention to provided an improved low-RPM lockout in which ignition is inhibited during underspeed conditions to prevent unintentional starting of the engine.

It is another object of the present invention to provide an improved accurate and reliable mechanism for determining an engine's operating speed.

Other features and advantages of the present invention will be apparent from the following description taken in conjunction with the accompanying drawings.

SUMMARY OF THE INVENTION

In order to achieve the foregoing objects, the present invention provides an electronic ignition and engine management system which generally includes a device for measuring engine operating speed and generating an operating speed signal, a mechanism for generating an ignition advance timing signal from the operating speed signal, a device for generating a top dead center signal, a mechanism for initiating an ignition pulse responsive to the advance timing signal when the operating speed signal is above a startup mode threshold and a mechanism for initiating an ignition pulse responsive to the startup signal when the operating speed signal is equal to or below the startup mode threshold.

In the preferred embodiment, the engine operating speed is measured using a sensor, a windowed encoder, a high speed clock and an RPM counter. The sensor has an infrared emitter and detector pair configured so that light emitted from the emitter is detected by the detector. The windowed encoder is mounted on the crankshaft so that it rotates with the crankshaft and interfaces with the sensor. The encoder has a reading edge which contains an RPM reading window and a startup indicator notch. The reading edge blocks light emitted by the emitter from being detected by the detector. As the encoder rotates, the RPM reading window and startup indicator notch pass between the emitter and detector and allow light emitted by the emitter to be detected by the detector. The high speed clock is configured to produce clock pulses when the RPM reading window passes between the emitter and detector allowing light emitted from the emitter to be detected by the detector. The RPM counter is configured to count the clock pulses generated by the high speed clock and determine the engine operating speed from the count. When the startup indicator notch passes between the emitter and detector and the engine RPM is equal to or below the startup mode threshold, the startup indicator signal is generated.

The mechanism for generating the ignition advance timing signal is made up of a mechanism for converting the operating speed signal into an address location in a memory array containing ignition advance timing values. An ignition advance timing value corresponding to the operating speed signal is then read from the memory location and an ignition advance timing signal is generated from the ignition advance timing value.

An ignition pulse is generated responsive to the advanced timing signal by loading the advanced timing value into data storage registers and counting out a delay included in the advanced timing value. Once the delay is counted out an ignition pulse is generated.

The electronic ignition and engine management system also includes low-RPM lockout, overspeed and low oil pressure protection. When the operating speed signal is determined to be below a low-RPM threshold, ignition pulses are inhibited so that an accidental engine startup condition is prevented. When the operating speed signal is determined to be exceeding an overspeed threshold, ignition pulses are inhibited so that the engine operating speed is prevented from exceeding the overspeed threshold.

Low oil pressure protection is accomplished by monitoring an oil pressure switch. When the oil pressure falls below a low oil pressure threshold the oil pressure switch becomes activated. If the oil pressure switch is activated for the minimum time out (i.e. 3.5 seconds) and the operating speed signal is above a S.L.O.W. (Speed Limiting Overheat Warning) threshold the engine is put into S.L.O.W. mode wherein the ignition pulses are inhibited so that the engine operating speed may not exceed the S.L.O.W. threshold. If the oil pressure switch becomes deactivated and the engine operating speed signal falls below a S.L.O.W. reset threshold, the engine is reset out of S.L.O.W. mode back into normal operation.

The advanced timing values contain status bits to indicate certain engine operating conditions. A START status bit is enabled for values which correspond to operating speed signals less than or equal to the startup mode threshold. An OVERSPEED bit is enabled for all values which correspond to operating speed signals above the overspeed threshold. A S.L.O.W. status bit is enabled for all values which correspond to operating speed signals equal to or above the S.L.O.W. threshold and a S.L.O.W. reset status bit is enabled for all values which correspond to operating speed signals equal to or below the S.L.O.W. reset threshold.

A method for determining ignition timing is also provided and includes measuring the engine operating speed and generating an operating speed signal, determining the advanced timing signal from the operating speed signal, generating the startup indicator signal, initiating the ignition pulse responsive to the advanced timing value when the operating speed signal is above the startup mode threshold and initiating the ignition pulse responsive to the startup indicator signal when the operating speed signal is equal to or below the startup mode threshold.

In the preferred embodiment, the engine operating speed is measured by counting clock pulses when light emitted by the emitter passes through the RPM reading window in the encoder and is detected by the detector and an operating speed signal is produced from the count.

The startup indicator signal is generated by sensing when the startup indicator notch passes between the emitter and detector and generating the startup indicator signal at that time.

The advanced ignition timing signal is determined by converting the operating speed signal into an address location in the memory array containing the ignition advance timing values, reading an ignition advance timing value located at the address location in the memory array and generating the ignition advance timing signal from the ignition advance timing value.

The method also includes inhibiting the ignition pulse when the operating speed signal falls below the low-RPM threshold, and inhibiting the ignition pulse so that the engine operating speed may not exceed the overspeed threshold when the operating speed signal approaches the overspeed threshold.

The method further includes monitoring the oil pressure. When the oil pressure falls below the low oil pressure threshold and the operating speed signal is above the S.L.O.W. threshold the system is put into S.L.O.W. mode wherein the ignition pulse is inhibited so that the engine operating speed is prevented from exceeding the S.L.O.W. threshold. When the operating speed signal falls below the S.L.O.W. reset threshold and the oil pressure rises above the low oil pressure threshold the system is reset out of S.L.O.W. mode.

The present invention also provides an integrated sensor and powerpack assembly. The integrated sensor and powerpack assembly includes an integrally formed hollow housing configured to receive and enclose an ignition timing circuit and having an area for receiving a windowed encoder, an infrared emitter and detector pair operably connected the outer surface of the housing in the area for receiving the windowed encoder, a molded stator connector for supplying a connection to an ignition coil and a mechanism for mounting the sensor and powerpack assembly to the engine crankcase.

In the preferred embodiment, the integrated sensor and powerpack is also configured for receiving operating power supplied magnetically from an under flywheel coil and lamination assembly. The housing is molded to include two levels. The lower level being the encoder receiving area and the upper level configured for receiving the ignition timing circuit and containing the molded stator connection and the mechanism for mounting the assembly.

BRIEF DESCRIPTION OF THE DRAWINGS

FIG. 1 is a perspective view showing a windowed encoder in accordance with the present invention;

FIG. 2 is a perspective view showing a power pack and sensor in accordance with the present invention;

DESCRIPTION OF THE PREFERRED EMBODIMENT

Broadly stated, the present invention presents an improved electronic ignition and engine management system in which a sensor in the engine determines the engine RPM. The RPM data is translated into an address in a memory array look-up table. Delay data is read from the memory array and sent to a series of delay counters which create an ignition pulse based on the delay. The ignition pulse generates a firing pulse to the ignition coil to commence ignition.

Preferred embodiments of an improved electronic ignition and engine management system are described herebelow with reference to the drawings.

Figure 3:
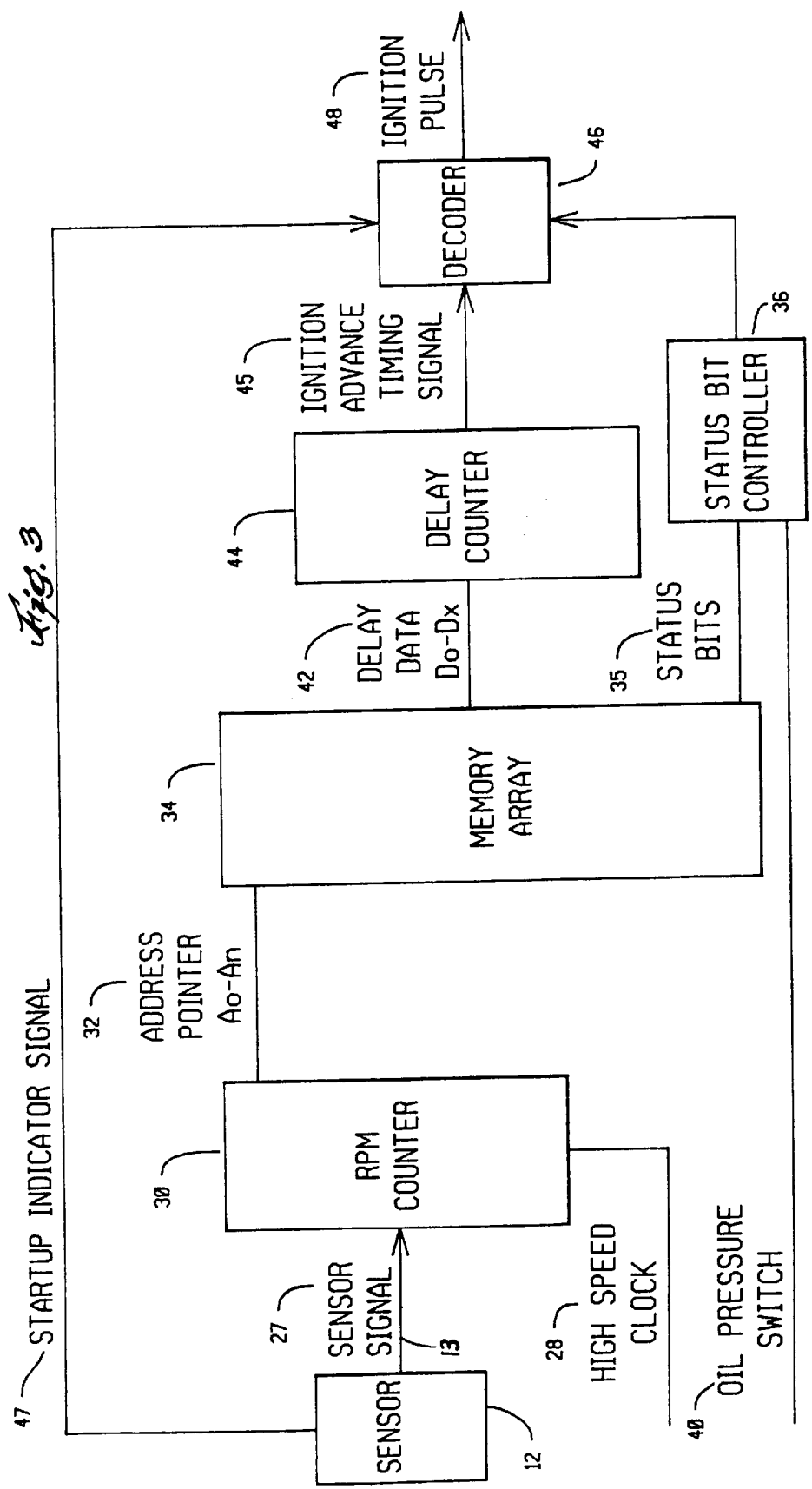
FIG. 3 is a block diagram of an electronic ignition and engine management system in accordance with the present invention.

Referring now to FIGS. 1, 2 and 3, the ignition event is determined as follows. First the engine speed is measured using a windowed encoder 10 and sensor unit 12. The encoder 10 contains a reading edge 14 which is divided into two main functional areas. The startup indicator notch 16 on the reading edge 14 is the reference point of the encoder areas. The area before the startup indicator notch, where the ignition is to fire, is referred to as the ignition range 18. The windowed area preceding the ignition range 18 is the RPM reading window 20. In one embodiment, the ignition range 18 is from 0 to 50 degrees before the startup indicator notch and the RPM reading window 20 is from 50 to 100 degrees before the startup indicator notch. The startup indicator notch 16 is typically 1 to 2 degrees in width.

The sensor 12 consists of an infrared emitter 22 and detector 24 configured as a single integrated package with the electronic advance and ignition circuits (not shown). The ignition coil high voltage and the operating power for the electronic advance are supplied magnetically from an under flywheel coil and lamination assembly. In operation the windowed encoder 10 is mounted on the crankshaft (not shown) to rotate with the crankshaft in the direction shown in FIG. 1. The power pack 26 is mounted in the engine so that the reading edge 14 of the windowed encoder 10 passes between the emitter 22 and detector 24.

The reading edge 14 prevents light from the emitter 22 from reaching the detector 24. When the RPM reading window 20 in the windowed encoder 10 passes between the emitter 22 and detector 24, light from the emitter 22 reaches the detector 24 and a sensor signal 27 is sent to an RPM counter 30 which enables a high speed clock 28. The RPM counter 30 measures the number of clock cycles within the RPM reading window 20. Based on the number of clock cycles that are measured, the average engine RPM can be determined for that revolution. If the count is within a range determined to indicate normal engine operation the count data is translated directly into a 12-bit address pointer 32 into a memory array 34 which is used as a look-up table.

The memory array 34 contains delay data in the form of a 16 bit value. In this embodiment, the memory array 34 is physically an 8K by 8 bit read-only memory chip. In order to supply the information in a 16 bit format, the memory array 34 is configured logically as being 4K by 16 bits. The high four bits are status bits which indicate the engine operating conditions. There is a start bit (START), an overspeed bit (OVERSPEED), a S.L.O.W. bit (SLOW) and a S.L.O.W. reset bit (SLOWRESET). The lower 12 bits contain the actual delay data information. The delay data has been calculated to meet the ignition timing requirements for an engine running at the measured RPM. The address pointer 32 points to a location in the memory array 34 which contains the delay data corresponding to the RPM measurement made for the current engine ignition cycle.

A status bit controller 36 is responsible for checking the appropriate status bits 35. The engine operating conditions dictate which status bits 35 are set during any giving ignition cycle. The status bit controller 36 has as inputs, an operating speed signal 38 produced by the RPM counter 30 and an oil pressure switch 40. The oil pressure switch 40 becomes activated when the engine oil pressure falls below a pre-programmed threshold level. Under normal operating conditions the oil pressure switch 40 is off.

The S.L.O.W. bit is programmed in the memory array 34, and checked by the status bit controller 36, for all RPM values over a threshold S.L.O.W. operating speed, generally around 2000–3000 RPM. If the oil pressure switch 40 is activated and the engine is running above the S.L.O.W. operating speed threshold, the engine is put into S.L.O.W. mode. The S.L.O.W. mode is a mode in which the engine RPM is prevented from going above a programmed threshold level. S.L.O.W. is accomplished by inhibiting the ignition at the decoder 46 such that the engine will only be allowed to operate at a reduced RPM level equal to the S.L.O.W. operating speed threshold.

The SLOWRESET bit is programmed in the memory array 34, and checked by the status bit controller 36, for all RPM values under a threshold SLOWRESET operating speed, generally around 1400 RPM. Once the oil pressure switch 40 returns to its normal off position and the engine operating speed drops below the SLOWRESET operating speed threshold the status bit controller 36 will automatically switch back to normal operating conditions.

As mentioned before, the delay data in the lookup tables has been calculated to meet the ignition timing requirements for an engine running at the measured RPM and engine operating conditions. This delay data 42 is transferred to a series of delay counters 44 and is used to provide a delay factor from the reference signal which, in this case, is the trailing edge of the RPM reading window 20. The delay is allowed to time out at which time an ignition advance timing signal 45 is generated and sent to the decoder 46 which initiates an ignition pulse 48 enabling the ignition firing circuit and completing the ignition firing event.

When the count data from the RPM counter 30 indicates that the engine is operating faster than a predetermined overspeed threshold, the engine is considered to be running in an overspeed condition. During overspeed conditions, delay data 42 representing a maximum count is loaded into the delay counter 44 and the status bit controller checks the OVERSPEED status bit, which is programmed in the memory array 34. The decoder 46 monitors the OVERSPEED status bit. When the OVERSPEED status bit is set, the decoder 46 prevents an ignition signal from being sent to the ignition coil. Ignition signals are inhibited until the engine speed drops below the overspeed threshold. This overspeed limit control is a programmed feature within all of the memory array lookup table entries.

If the count in the RPM counter 30 exceeds the counter capability, a counter overrun condition is encountered and the RPM is determined to be under the low-RPM cutout threshold. Under these conditions, the status bit controller 36 signals the decoder 46 and the decoder 46 prevents ignition signals from being sent to the ignition coil. This prevents the operator from unintentionally starting the engine.

Startup conditions generally provide the greatest likelihood of ignition timing errors. During startup conditions, the decoder 46 disconnects the advanced ignition timing signal 45 and connects a startup indication signal 47 from the sensor 12 to the ignition firing circuit. When the startup indication notch 16 passes between the emitter 22 and detector 24, the sensor 12 is triggered and the startup indication signal 47 is sent. The decoder sends an ignition pulse 48 responsive to the startup indication signal 47 to the ignition coil and the ignition firing event is completed. In startup situations, the ignition system is switched from a timer based system to an event based system. Therefore, regardless of the variation in engine RPM during that rotation, the ignition fires at the startup indication point. This eliminates the advance firing condition and prevents the kickback and lock-up conditions mentioned earlier. By selecting the RPM threshold correctly, typically around 600 RPM, there is no loss in runnability since the preprogrammed advance curve can be switched in at any point, usually covering the lowest idle RPM through the maximum operating RPM.

Each ignition cycle is measured and programmed prior to the actual ignition pulse rather than based on the proceeding cycle or an average over several cycles.

Figure 4:
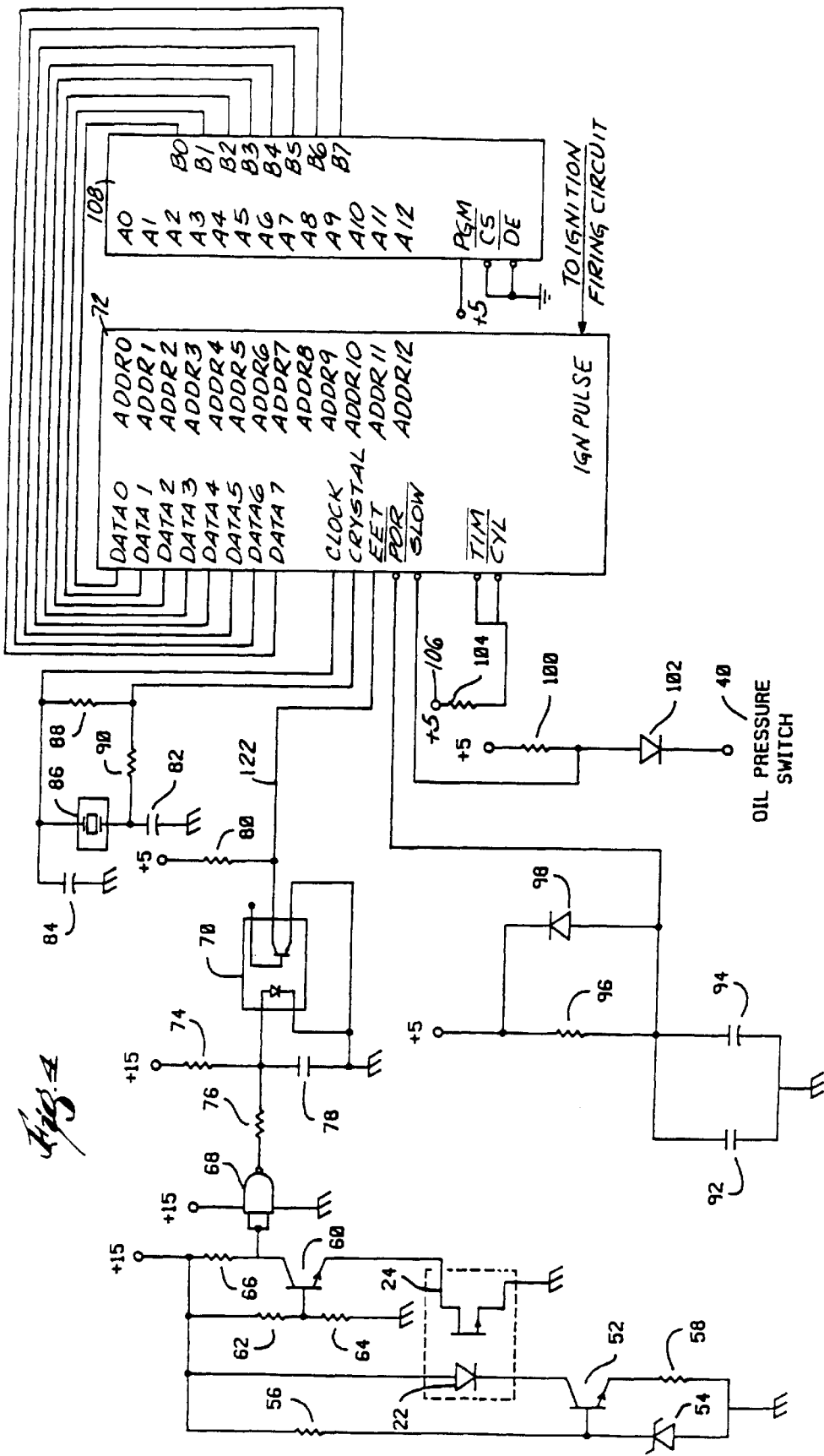
FIG. 4 is a circuit diagram showing one embodiment of an engine management system as shown in FIG. 3 and in accordance with the present invention.

A circuit diagram of the sensor 12 and ignition system is shown in FIG. 4. As mentioned above, the emitter 22 is an infrared light source. A constant current source is provided to the emitter 22 by a transistor 52 in conjunction with a zener diode 54 and biasing resistors 56 and 58. When light from the emitter 22 is detected by the detector 24, the detector turns on thus activating a transistor 60. Resistors 62, 64 and 66 act as biasing resistors for the transistor 60.

A high current NAND driver 68 is connected to the collector of the transistor 60 and acts as an amplifying buffer which amplifies the current coming off the collector of transistor 60. An opto-isolator 70 is connected to the output of the NAND driver 68. The opto-isolator 70 operates to isolate the high current output of the NAND driver 68 from a custom chip 72 and is meant to reduce some of the signal noise which is found in high noise environments such as an outboard marine engine. Resistors 74 and 76 and capacitor 78 regulate the current supplied to the opto-isolator 70 from the NAND driver 68. Resistor 80 acts to regulate the power supplied from the opto-isolator 70 to the custom chip 72.

Capacitors 82 and 84 are startup capacitors which are meant to excite a resonator 86 upon startup. This causes the resonator 86 to go into oscillation. Resistors 88 and 90 are biasing resistors which also insure proper startup. Once the resonator 86 is oscillating it provides an accurate and reliable high speed clock input, typically 2.5 MHz, to the custom chip 72.

Capacitors 92 and 94, resistor 96 and diode 98 provide a power on reset circuit to the custom chip 72. This circuit is meant to insure that upon power-up the power level reaches a stable point before allowing the custom chip 72 to start operating. This also insures that all counters in the custom chip 72 will be held in a reset state until proper power is supplied.

The oil pressure switch 40 is connected as an input to the custom chip 72. The resistor 100 and diode 102 act together as a blocking/pull-up network for the oil pressure switch 40. When the oil pressure goes below a threshold pressure level, the blocking/pull-up network holds the input to the custom chip 72 low indicating critical engine operating conditions.

The resistor 104 and 5 v power supply 106 are provided for disabling unused inputs, inverted TIM and inverted CYL, on the custom chip 72.

A read-only memory chip (ROM) 108 is connected to the custom chip 72 with address lines ADDR0–ADDR12 from the custom chip 72 as inputs. Data lines D0–D7 of the ROM chip 108 are provided as inputs to the custom chip 72. The IGN PULSE pin of the custom chip 72 provides a signal to the ignition firing circuit which completes the ignition firing.

Figure 5:
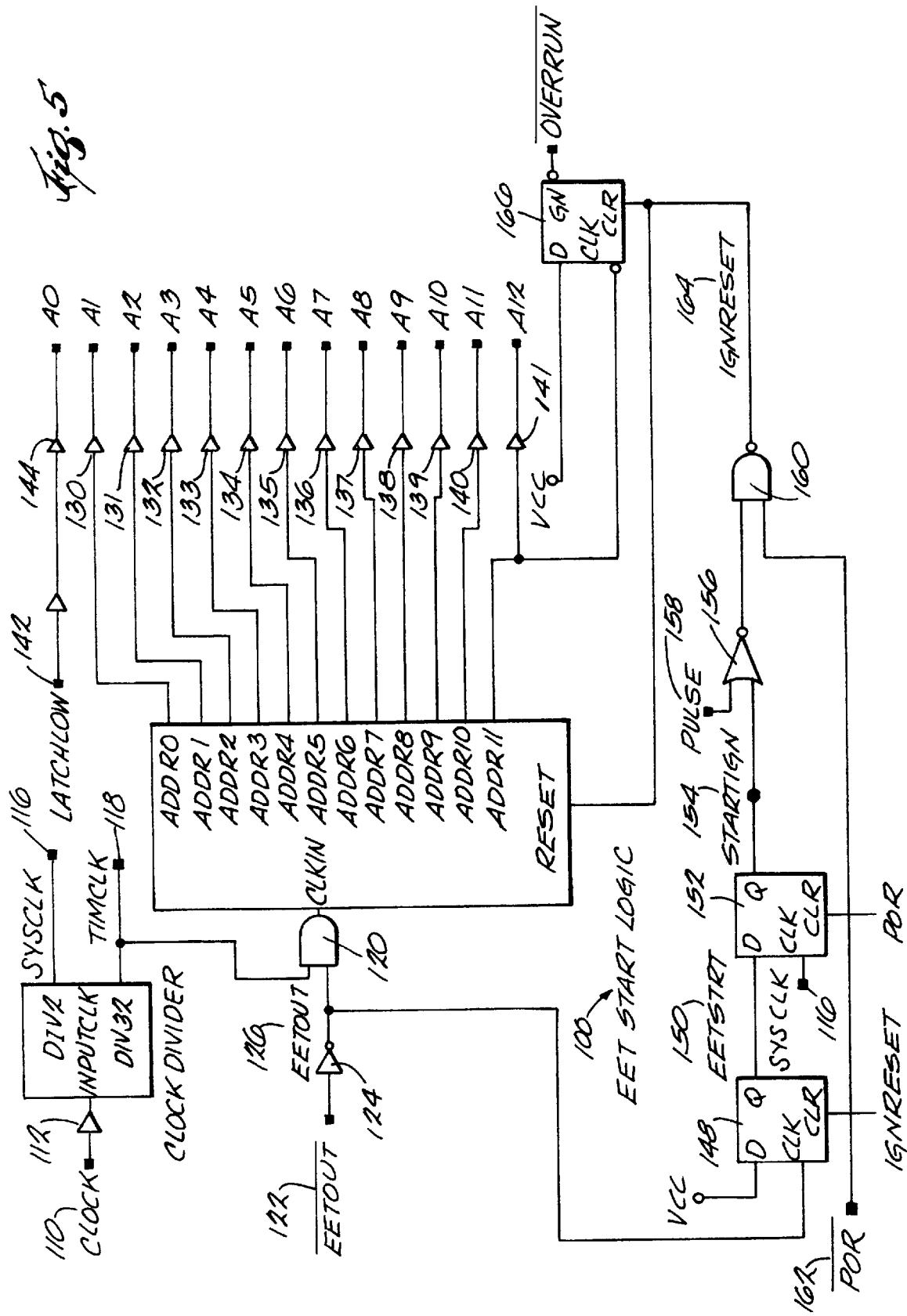
FIG. 5 is a circuit diagram showing a high-speed clock and window counter low-RPM lockout as shown in FIG. 3 and in accordance with the present invention.

A circuit diagram of the RPM counter 30 is shown in FIG. 5 and is contained in the custom chip 72. The CLOCK input 110 is the high-speed clock 30 and comes into pin 33 of the custom chip 72 from the resonator 86. It is fed through a clock buffer 112 into a clock divider 114. The clock divider 114 provides a system clock output 116, which is ½ the speed of the CLOCK-33 input 110, and a time clock output 118, which is 1/32 the speed of the CLOCK-33 input 110. The time clock 118 is fed into the A input of an AND gate 120. An inverted EETOUT signal 122 is fed through an inverter 124 to create an EETOUT signal 126. EETOUT 126 is fed into the B input of the AND gate 88. The inverted EETOUT signal 122 is provided by the opto-isolator 70 and is on when light from the emitter 22 reaches the detector 24. It corresponds generally to the sensor signal 13 of FIG. 3. The output of the AND gate 120 provides an input to a window counter 128. The window counter 128 counts the number of clock pulses that occur during the time period when light passes between the emitter 22 and detector 24. From that count, the window counter 128 produces an address pointer, as an output, on lines ADDR0–ADDR11. Address lines ADDR0–ADDR11 are passed through output buffers 130–141 and correspond to output lines ADDR1–ADDR12 on the custom chip 72. Address lines ADDR0–ADDR11 correspond generally to the address pointer 32 of FIG. 3.

As described above, in this embodiment the ROM memory chip 108 is physically configured to be 8K by 8 bits. In order to produce the 16 bit delay data required by the delay counters 44, two separate read operations are performed in which first the low byte of data is read from the ROM memory chip 108 and then the high byte of data is read. A LATCHLOW signal 142, provided by the delay counter control logic circuit, is fed through an output buffer 144, as address line ADDR0 of the custom chip 72, into the ROM memory chip 108 to facilitate the read operations.

In order to ensure the window counter 128 is reset before every timing calculation, an EET start logic circuit 146 is provided to reset the counters whenever the leading edge of an encoder 10 window is detected. The EETOUT signal 126 is fed into a flip-flop 148 which produces, at its output, an EETSTART signal 150. The EETSTART signal 150 is fed into another flip-flop 152, along with the system clock 116 to produce a STARTIGN signal 154. The STARTIGN signal 154 is fed through a NOR gate 156 along with a pulse signal provided by a digital one-shot circuit included in the ignition firing circuit. The output of the NOR gate 156 is fed into a NAND gate 160 along with an inverted POR-18 signal provided at pin 18 of the custom chip 72 by the power on reset circuit to produce an IGNRESET signal 164. The IGNRESET signal 164 is fed into the window counter 128 and is responsible for resetting the counters before every ignition cycle. The IGNRESET signal 164 is also fed into the LOW-RPM LOCK-OUT latch 166.

Figure 6:
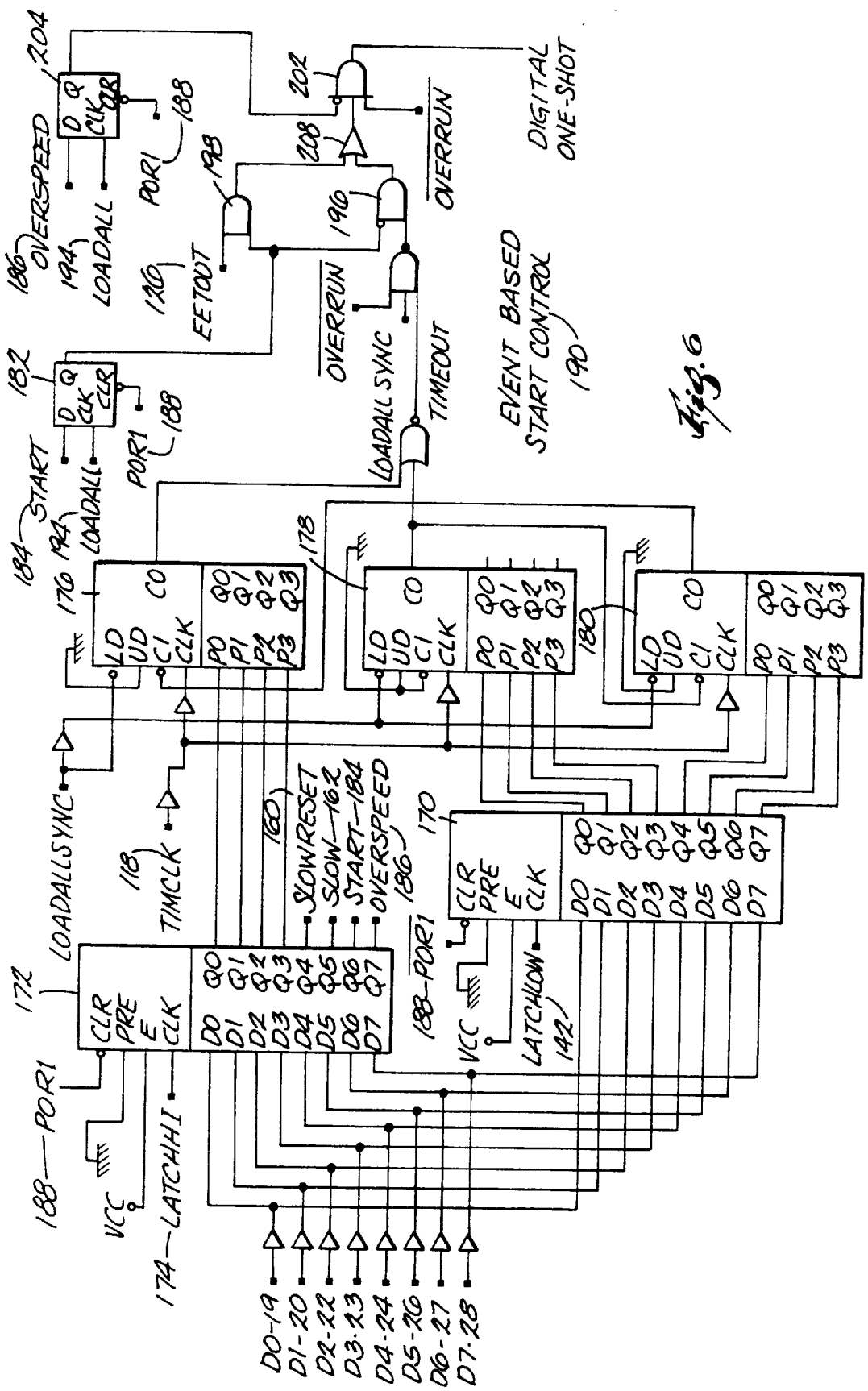
FIG. 6 is a circuit diagram showing delay counters and a decoder as shown in FIG. 3 and in accordance with the present invention.

The delay counter 44 circuit diagram is shown in detail in FIG. 6. The 16 bit delay data 42 is stored in two 8 bit registers, LATCHLOW REG 170 and LATCHHI REG 172. When LATCHLOW 142 is low, a read operation is issued and a byte of data is read from the ROM chip 108, via data lines D0–D7 and loaded into the LATCHLOW REG 170. When the LATCHLOW 142 is toggled high, a second read operation is issued upon receiving a LATCHHI signal 174 from the delay counter control logic circuit and a second byte of data is read from the ROM chip 108 and loaded into the LATCHHI REG 172. Together the data stored in LATCHLOW REG 170 and LATCHHI REG 172 make up the 16 bit delay data 42. The outputs of the LATCHLOW REG 170 and LATCHHI REG 172 are fed into delay counters 176, 178 and 180, which count down the delay. Outputs Q4, Q5, Q6 and Q7 of the LATCHHI REG 172 produce the status bits 35 SLOWRESET 180, S.L.O.W. 182, START 184 and OVERSPEED 186 respectively. An inverted POR-1 signal, provided by the EET START LOGIC circuit, is fed into the CLR input of the LATCHLOW REG 170 and LATCHHI REG 172 to ensure proper startup.

The event based start control 190 corresponds generally to the decoder 46. In order to prevent engine lockup and kickback during engine startup conditions, below a startup engine speed threshold typically around 600 RPM, an engine ignition pulse is configured to occur at or near top dead center (T.D.C.). The START bit 184 is programmed on for all delay data corresponding to an RPM value less than the startup engine speed threshold. The START bit 184 is clocked through a flip-flop 192 with the LOADALL signal 194 from the delay counter control logic circuit. The output of the flip flop 182 is fed into an AND gate 196 with the EETOUT signal 126 as the second input. The output of the flip flop 182 bit is inverted and fed into a second AND gate 198 with the output of the delay counters circuit as the second input. If the START bit 184 is enabled, the output of the delay counters circuit, the ignition advance timing signal, is inhibited and the EETOUT signal 126 is passed through. The outputs of the AND gates 196 and 198 are passed through an OR gate 200 and on to a final AND gate 202 before being sent to the digital one-shot circuit. In the case when the START bit 184 is enabled, EETOUT 126 will be triggered by the leading edge of the startup indicator notch 16. It corresponds generally to the startup indicator signal of FIG. 3. Therefore, ignition timing will no longer be dependent on engine speed but will be event based and will occur at or near T.D.C.

The final AND gate 202 acts as a switch which will disable the ignition pulse during overspeed or low-RPM conditions. During overspeed conditions, generally when the engine is running above 6200 RPM, the OVERSPEED bit 186 is set in the status bits 35 of the 16 bit delay data. The OVERSPEED bit 186 is fed, through a flip-flop 204, and provides an input to the final AND gate 202. Therefore, when the OVERSPEED bit 186 is set, the final AND gate 202 will inhibit an ignition signal from being sent to the digital one-shot circuit.

Low RPM lock-out is accomplished by monitoring ADDR11 of the window counter 128. During low RPM periods, the window counter 128 will overflow. By feeding the ADDR11 output of the window counter 128 through a flip-flop 166, overflow conditions can be detected and a latched inverted OVERRUN signal 206 is generated at the output of the flip-flop 166. The inverted OVERRUN signal 208 is also fed, as an input, into the final AND gate 202. Therefore, during low-RPM conditions an inverted OVERRUN signal 208 is generated, which inhibits an ignition signal from being sent to the digital one-shot circuit by not allowing the ignition signal to pass through the final AND gate 202.

Figure 7:
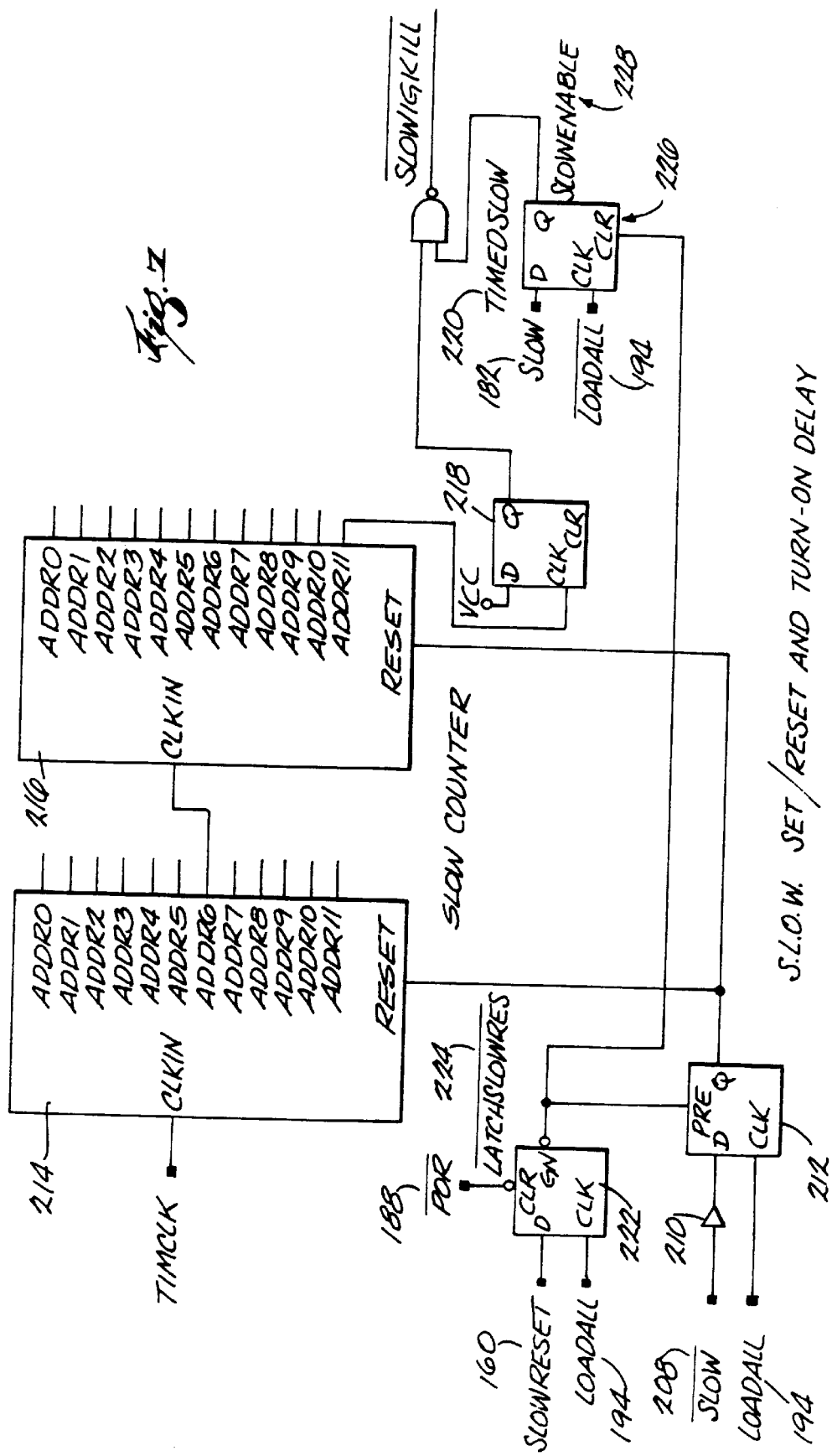
FIG. 7 is a circuit diagram showing a low-RPM set/reset and turn-on delay circuit as shown in FIG. 3 and in accordance with the present invention.

SLOW set/reset is accomplished by monitoring engine conditions through a SLOW set/reset and turn-on delay circuit as illustrated in FIG. 7. Pin 44 of the custom chip 72 monitors an oil pressure switch signal inverted SLOW 204. The inverted SLOW signal 204 is passed through an input buffer 210 and flip-flop 212 and into the slow counters 214 and 216. When the oil pressure switch 40 is activated, the slow counters 214 and 216 begin counting. If the oil pressure switch 40 remains activated for more than a predetermined amount of time, typically around 3.5 seconds, the counters timeout and address line ADDR11 on the counter 216 becomes activated. Address line ADDR11 is fed into the CLK input of a flip-flop 218. When ADDR11 of counter 216 becomes active, a TIMEDSLOW signal 220 is produced at the output of the flip-flop 218. The SLOWRESET bit 180 is fed into a flip-flop 222 to produce an inverted LATCHSLOWRES signal 224. The inverted LATCHSLOWRES signal is fed into the PRE input of flip-flop 212. The SLOW bit 182 is fed into a flip-flop 226 along with the inverted LATCHSLOWRES signal 224 and if the SLOW bit 182 is enabled a SLOWENABLE signal is generated. The TIMEDSLOW signal 220 and the SLOWENABLE 228 are fed into a NAND gate 230 and if both signals are enabled, an inverted SLOWIGKILL signal 232 is produced which puts the engine into SLOW mode.

Figure 8:
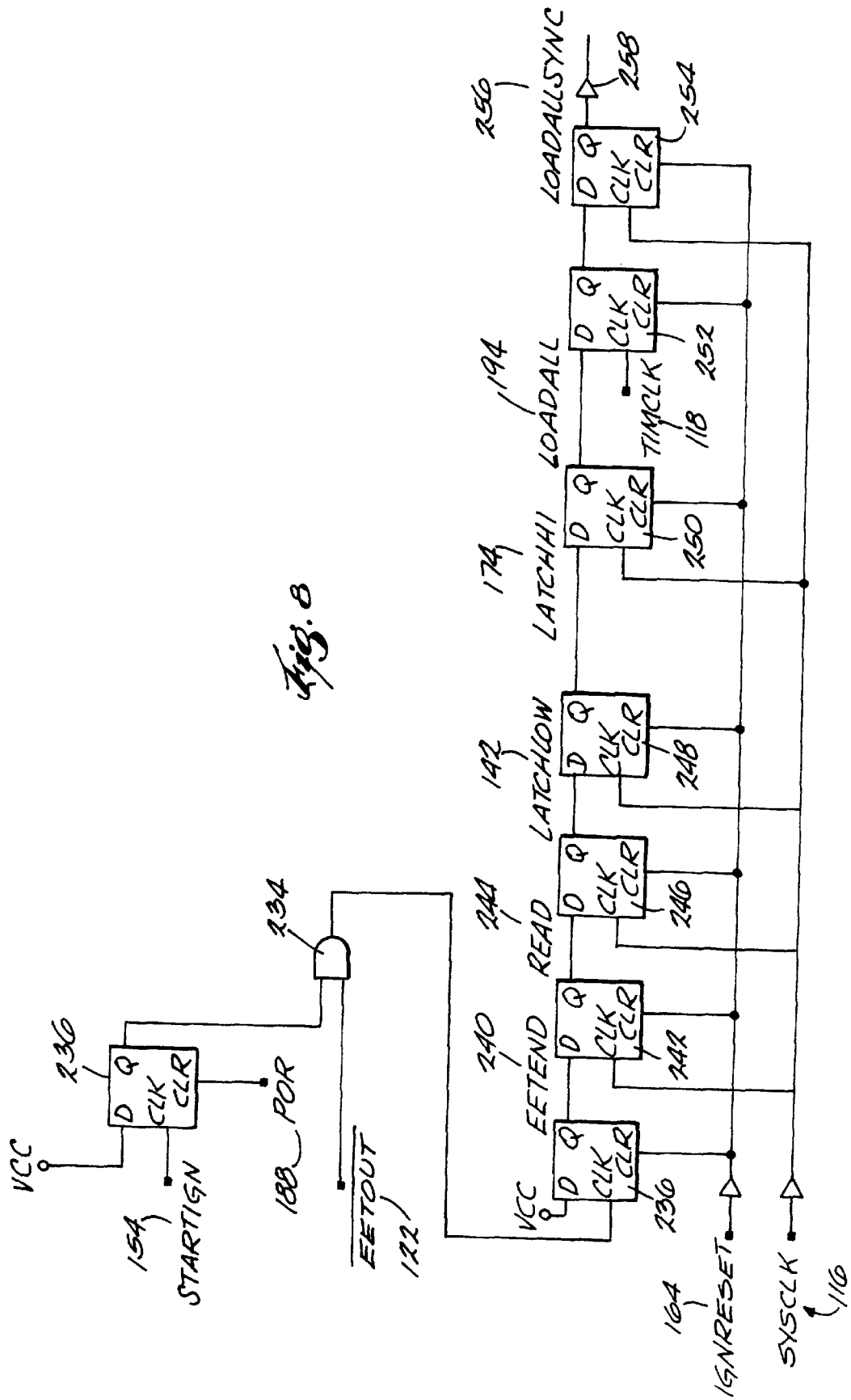
FIG. 8 is a circuit diagram showing a delay counter control logic circuit in accordance with the present invention.

The delay counter control logic circuit is shown in FIG. 8. Before the process of generating an ignition pulse begins, the delay counter control logic circuit checks to make sure that the current cycle did not begin improperly. For example, inaccurate RPM readings would result if the system power came on during a period when one of the windows on the encoder 10 was allowing light to pass between the emitter 22 and detector 24. Therefore, the inverted EETOUT signal 122 is fed into an AND gate 234. The STARTIGN signal 154 is passed through a flip-flop 236 and the output of the flip-flop 236 is fed into the AND gate 234. The STARTIGN signal 154 corresponds to the leading edge of one of the windows on the encoder 10. Therefore, the inverted EETOUT signal 122 is inhibited unless the leading edge of the window was recognized first. During normal operation, the inverted EETOUT signal 122 is passed through the AND gate 234 into a flip-flop 238. The flip-flip 238 produces an EETEND signal 240. The EETEND signal 240 is clocked through a flip-flop 242 to produce a READ signal 244. The READ signal 244 is clocked through a flip-flop 246 to produce the LATCHLOW signal 142. The LATCHLOW signal 142 is clocked through a flip-flop 248 to produce the LATCHHI signal 174. The LATCHHI signal 174 is clocked through a flip-flop 250 to produce the LOADALL signal 194. Finally, the LOADALL signal 194 is clocked through a flip-flop 252 with the TIMCLK signal 118. The output from the flip-flop 252 is clocked through a flip-flop 254 to produce the LOADALLSYNC signal 256. The LOADALLSYNC signal 256 is passed through an output buffer 258 on pin 39 of the custom chip 72. The SYSCLK signal 116 is fed into the CLK input of all the flip-flops to provide the timing and the IGNRESET signal 164 is fed into the CLR input of the flip-flops to reset them for every ignition cycle.

It will be appreciated that the above-disclosed embodiment is well calculated to achieve the aforementioned objectives of the present invention. In addition, it is evident that those skilled in the art, once given the benefit of the foregoing disclosure, may now make modifications of the specific embodiment described herein without departing from the spirit of the present invention. Such modifications are considered within the scope of the present invention which is limited solely by the scope and spirit of the appended claims.

What is claimed is:

1. An electronic ignition and engine management system with anti-lockup and anti-kickback features for use in an internal combustion marine engine of the type which has a crankshaft and an oil pressure lubrication system, the management system comprising:

means for measuring the operating speed of the engine and generating an operating speed signal;

means for generating an ignition advance timing signal from said operating speed signal;

means for generating a startup indicator signal indicating a rotary position of the engine crankshaft;

means for initiating a first ignition pulse responsive to said ignition advance timing signal to cause a timer based operation only when said operating speed signal is above a startup mode threshold; and means for initiating a second ignition pulse responsive to said ignition startup indicator signal to cause an event based ignition according to the rotary position of said engine crankshaft only when said operating speed signal is not above said startup mode threshold.

2. An electronic ignition and engine management system according to claim 1 wherein said means for generating an ignition advance timing signal comprises:

means for converting said operating speed signal into an address location in a memory array containing ignition advance timing values;

means for reading an ignition advance timing value located at said address location in said memory array; and means for generating said ignition advance timing signal from said ignition advance timing value.

3. An electronic ignition and engine management system according to claim 1 wherein said means for measuring operating speed and generating said operating speed signal comprises:

a sensor having an infrared emitter and detector pair configured so that light emitted from said emitter is detected by said detector;

a windowed encoder operably connected to the crankshaft so that said encoder rotates with the crankshaft, said encoder having a reading edge containing a startup indicator notch, and an RPM reading window configured so that said reading edge rotates between said emitter and detector preventing light emitted from said emitter from being detected by said detector and configured so that light emitted from said emitter can be detected by said detector when said RPM reading window and said startup indicator notch pass between said emitter and detector;

a free running high speed clock configured to produce clock pulses when light emitted from said emitter is detected by said detector and to remain inactive when light emitted from said emitter is prevented from being detected by said detector; and an RPM counter configured to count said clock pulses generated by said high speed clock and generate said operating speed signal from said count indicative of the engine operating speed.

4. An electronic ignition and engine management system according to claim 3 wherein said means for generating a startup indicator signal comprises:

means for sensing when said startup indicator notch passes between said emitter and detector; and means for generating said startup indicator signal when said startup indicator notch passes between said emitter and detector.

5. An electronic ignition and engine management system according to claim 1 wherein the management system further comprises:

means for inhibiting said first ignition pulse when said operating speed signal reaches an overspeed threshold, so that the engine speed may not exceed said overspeed threshold.

6. An electronic ignition and engine management system according to claim 1 wherein the management system further comprises:

means for enabling a S.L.O.W. mode when the oil pressure falls below a low oil pressure threshold and said operating speed signal exceeds a S.L.O.W. threshold wherein in said S.L.O.W. mode said ignition pulse is inhibited so that the engine operating speed is prevented from exceeding said S.L.O.W. threshold.

7. An electronic ignition and engine management system according to claim 6 wherein, the management system further comprises:

means for resetting the system out of S.L.O.W. mode when the oil pressure rises above said low oil pressure threshold and said operation speed signal falls below a S.L.O.W. reset threshold.

8. An electronic ignition and engine management system according to claim 1 wherein the management system further comprises:

means for inhibiting said first and second ignition pulses when said operating speed signal falls below a low-RPM lockout threshold.

9. An electronic ignition and engine management system with anti-lockup and anti-kickback features for use in an internal combustion marine engine of the type which has a crankshaft and an oil pressure lubricating system, the management system comprising:

a sensor having an infrared emitter and detector pair configured so that light emitted from said emitter is detected by said detector;

a windowed encoder operably connected to the crankshaft so that said encoder rotates with the crankshaft, said encoder having a reading edge containing a startup indicator notch, and an RPM reading window configured so that said reading edge rotates between said emitter and detector preventing light emitted from said emitter from being detected by said detector and configured so that light emitted from said emitter can be detected by said detector when said RPM reading window and said startup indicator notch pass between said emitter and detector;

a free running high speed clock configured to produce a clock pulse signal when light emitted from said emitter is detected by said detector and to remain inactive when light emitted from said emitter is prevented from being detected by said detector;

a means for generating an operating speed signal from said clock pulse signal indicative of the engine operating speed;

a memory array containing ignition timing advance values calculated to correspond to engine operating speeds;

means for converting said operating speed signal into an address location in said memory array corresponding to the engine operating speed;

means for reading an ignition advance timing value from said memory array at said address location for generating an ignition advance timing signal;

means for sensing when said startup indicator notch passes between said emitter and detector;

means for generating a startup indicator signal when said startup indicator notch passes between said emitter and detector;

means for initiating a first ignition pulse responsive to said ignition advance timing signal to cause a time based ignition only when said operating speed signal is above a startup mode threshold; and means for initiating a second ignition pulse responsive to said startup indicator signal to cause an event based ignition according to the rotary position of said engine crankshaft only when said operating speed signal is not above said startup mode threshold.

10. An electronic ignition and engine management system according to claim 9 wherein the management system further comprises:

means for inhibiting said first and second ignition pulses when said operating speed signal falls below a low-RPM lockout threshold.

11. An electronic ignition and engine management system according to claim 9 wherein said ignition timing advance values further comprise:

a delay timing value calculated to correspond to a specific engine operating speed; and a start status bit which is enabled only for all operating speed signals not above the startup mode threshold and which is disabled only for all operating speed signals above the startup mode threshold.

12. An electronic ignition and engine management system according to claim 11 wherein said means for initiating an ignition pulse responsive to said startup indicator signal further comprises:

means for checking said start status bit and inhibiting said ignition advance timing signal when said start status bit is enabled; and means for initiating said second ignition pulse responsive to said startup indicator signal when said start status bit is enabled.

13. An electronic ignition and engine management system according to claim 11 wherein said means for initiating an ignition pulse responsive to said advance timing signal further comprises:

at least one data storage register for storing said ignition advance timing value;

at least one delay counter for counting out said delay timing value; and means for initiating said ignition pulse when said delay timing value is counted out.

14. An electronic ignition and engine management system according to claim 11 wherein said ignition timing advance values further comprise:

an overspeed status bit which is enabled only for all operating speed signals above an overspeed threshold and which is disabled only for all operating speed signals not above said overspeed threshold.

15. An electronic ignition and engine management system according to claim 14 wherein the management system further comprises:

means for inhibiting said first ignition pulse when said overspeed status bit is enabled, so that the engine operating speed may not exceed said overspeed threshold.

16. An electronic ignition and engine management system according to claim 10 wherein said ignition timing advance values further comprise:

a S.L.O.W. status bit which is enabled only for all operating speed signals not below a slow threshold and disabled only for all operating speed signals below said slow threshold.

17. An electronic ignition and engine management system according to claim 16 wherein the management system further comprises:

means for enabling a S.L.O.W. mode when said S.L.O.W. status bit is enabled and the oil pressure is below a low oil pressure threshold wherein in said S.L.O.W. mode said ignition pulse is inhibited so that the engine operating speed is prevented from exceeding said threshold.

18. An electronic ignition and engine management system according to claim 17 wherein said ignition timing advance values further comprise:

a S.L.O.W. reset status bit which is enabled only for all operating speed signals not above a S.L.O.W. reset threshold and which is disabled only for all operating speed signals above said S.L.O.W. reset threshold.

19. An electronic ignition and engine management system according to claim 18 wherein the management system further comprises:

means for resetting the system out of S.L.O.W. mode when the oil pressure rises above a low oil pressure threshold and said S.L.O.W. reset status bit is enabled.

20. A method for determining ignition timing for an internal combustion marine engine of the type which has a crankshaft and an oil pressure lubricating system, the method comprising the steps of:

measuring engine operating speed and generating an operating speed signal;

generating an ignition advance timing signal from said operating speed signal;

generating a startup indicator signal indicating a rotary position of the engine crankshaft;

initiating a first ignition pulse responsive to said advance timing signal to cause a timer based ignition only when said operating speed signal is above a startup mode threshold; and initiating a second ignition pulse responsive to said startup indicator signal to cause an event based ignition according to the rotary position of the engine crankshaft only when said operating speed signal is not above said startup mode threshold.

21. A method for determining ignition timing according to claim 20 wherein said step of generating said ignition advanced timing signal comprises the steps of:

converting said operating speed signal into an address location in a memory array containing ignition advance timing values;

reading an ignition advance timing value located at said address location in said memory array; and generating said ignition advance timing signal from said ignition advance timing value.

22. A method for determining ignition timing according to claim 20 wherein the method further comprising the steps of:

inhibiting said first and second ignition pulses when said operating speed signal falls below a low-RPM lockout threshold.

23. A method for determining ignition timing according to claim 20 wherein the method further comprising the steps of:

inhibiting said ignition pulse when said operating speed signal reaches an overspeed threshold, so that the engine operating speed may not exceed said overspeed threshold.

24. A method for determining ignition timing according to claim 20 wherein the method further comprising the steps of:

enabling a S.L.O.W. mode when the oil pressure falls below a low oil pressure threshold and said operating speed signal exceeds a S.L.O.W. threshold wherein in said S.L.O.W. mode said ignition pulse is inhibited so that the engine operating speed is prevented from exceeding said S.L.O.W. threshold.

25. A method for determining ignition timing according to claim 24 wherein the method further comprising the steps of:

resetting the system out of S.L.O.W. mode when the oil pressure rises above said low oil pressure threshold and said operation speed signal falls below a S.L.O.W. reset threshold.

26. A method for determining ignition timing according to claim 20 wherein the step of generating a startup indicator signal comprises the steps of:

sensing when said startup indicator notch passes between said emitter and detector; and generating said startup indicator signal when said startup indicator notch passes between said emitter and detector.

27. A method for determining ignition timing according to claim 20 wherein said step of measuring engine operating speed and generating said operating speed signal further comprises the steps of:

producing a clock pulse signal when light emitted by an emitter passes through an RPM reading window in an encoder and is detected by a detector said encoder being positioned between said emitter and detector and connected to the crankshaft of the engine so that said encoder rotates with the crankshaft;

generating said operating speed signal from said clock pulse signal indicative of the engine operating speed.

28. A method for determining ignition timing for an internal combustion marine engine of the type which has a crankshaft and an oil pressure lubricating system, the method comprising the steps of:

producing a clock pulse signal when light emitted by an emitter passes through an RPM reading window in an encoder and is detected by a detector, said encoder being positioned between said emitter and detector and connected to the crankshaft of the engine so that said encoder rotates with the crankshaft;

generating an operating speed signal from said clock pulse signal indicative of the engine operating speed;

converting said operating speed signal into an address location in a memory array containing ignition advance timing values;

reading an ignition advance timing value located at said address location in said memory array;

generating said ignition advance timing signal from said ignition advance timing value;

sensing when said startup indicator notch passes between said emitter and detector;

generating said startup indicator signal when said startup indicator notch passes between said emitter and detector;

initiating a first ignition pulse responsive to said ignition advance timing value to cause a timer based ignition only when said operating speed signal is above a startup mode threshold; and initiating a second ignition pulse responsive to said startup indicator signal to cause an event based ignition according to the rotary position of said engine crankshaft only when said operating speed signal is not above said startup mode threshold.

29. A method for determining ignition timing according to claim 28 wherein the method further comprising the steps of:

inhibiting said first and second ignition pulses when said operating speed signal falls below a low-RPM lockout threshold.

30. A method for determining ignition timing according to claim 28 wherein the method further comprising the steps of:

inhibiting said ignition pulse when said operating speed signal reaches an overspeed threshold, so that the engine operating speed may not exceed said overspeed threshold.

31. A method for determining ignition timing according to claim 28 wherein the method further comprising the steps of:

enabling a S.L.O.W. mode when the oil pressure falls below a low oil pressure threshold and said operating speed signal exceeds a S.L.O.W. threshold wherein in said S.L.O.W. mode said ignition pulse is inhibited so that the engine operating speed is prevented from exceeding said S.L.O.W. threshold.

32. A method for determining ignition timing according to claim 31 wherein the method further comprising the steps of:

resetting the system out of S.L.O.W. mode when the oil pressure rises above said low oil pressure threshold and said operation speed signal falls below a S.L.O.W. reset threshold.

33. An integrated sensor and powerpack assembly for use with an engine comprising:

an integrally formed hollow housing configured to receive and enclose an ignition timing circuit and having an area for receiving a windowed encoder that includes an engine RPM reading window;

an infrared emitter and detector pair operably connected to an outer surface of said housing in said area for receiving said windowed encoder and providing a signal for enabling the determination of average engine RPM during the presence of the RPM reading window;

means for connecting said ignition timing circuit to an ignition coil; and means for mounting the assembly to an engine block.

34. The integrated sensor and powerpack assembly according to claim 33 further comprising:

means for receiving operating power supplied magnetically from an under flywheel coil and lamination assembly.

35. The integrated sensor and powerpack assembly according to claim 33 wherein said housing being molded to include an upper level and lower level.

36. The integrated sensor and powerpack assembly according to claim 35 wherein said lower level being configured as said encoding receiving area.

37. The integrated sensor and powerpack assembly according to claim 35 wherein said upper level being configured for receiving said ignition timing circuit.

38. The integrated sensor and powerpack assembly according to claim 35 wherein said means for connecting said ignition timing circuit to said ignition coil comprises a molded stator connection mounted on an outer surface of said upper level.

* * * * *